June 26, 1928.
G. E. SUNDELL ET AL
1,674,807
AUTOMOBILE ACCESSORY
Filed May 24, 1927   2 Sheets-Sheet 1
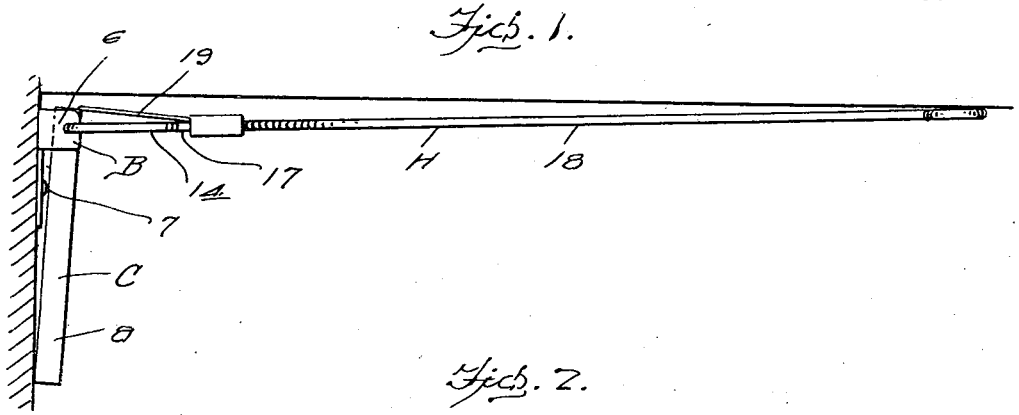
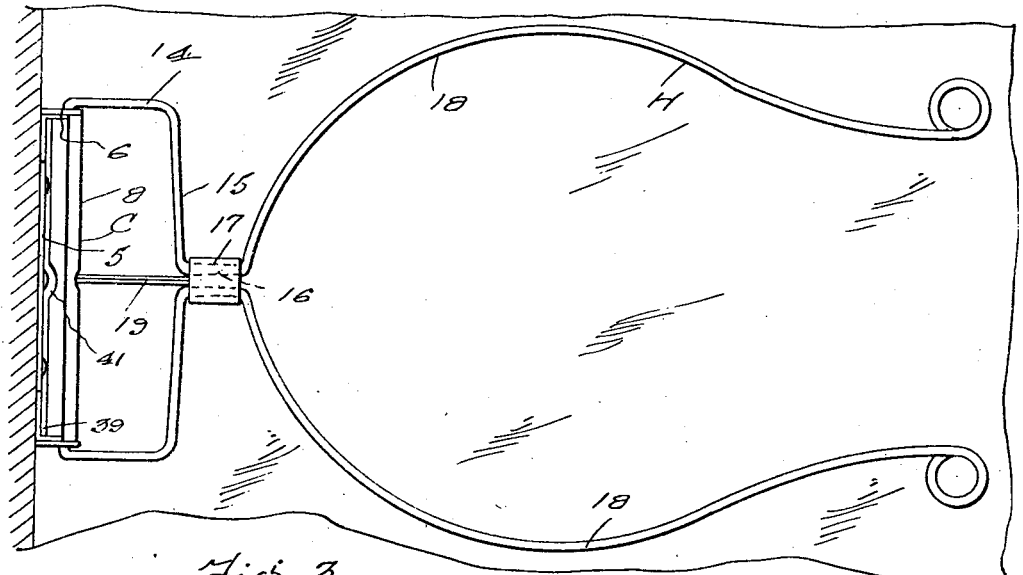
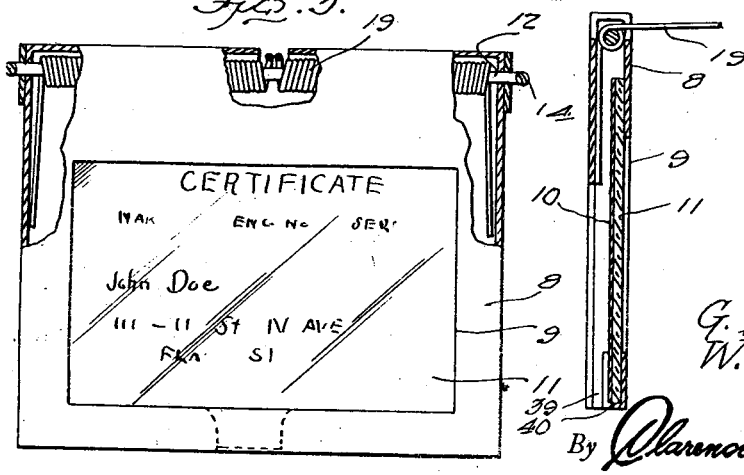
Inventors
G. E. Sundell
W. R. Sundell
By Clarence A. O'Brien
Attorney June 26, 1928.
G. E. SUNDELL ET AL
1,674,807
AUTOMOBILE ACCESSORY
Filed May 24, 1927 2 Sheets-Sheet 2
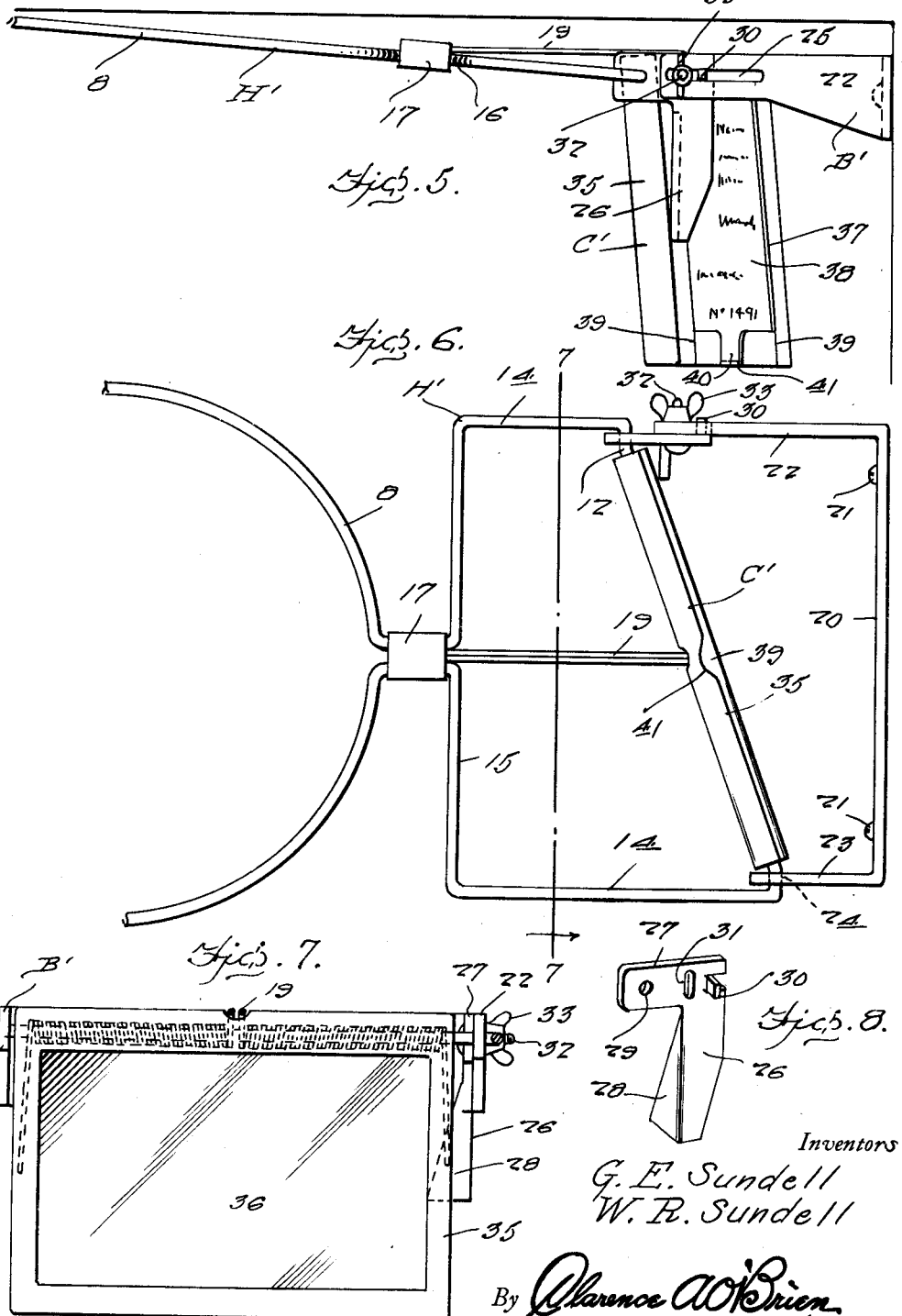
Inventors
G. E. Sundell
W. R. Sundell
By Clarence A. O'Brien
Attorney Patented June 26, 1928.

1,674,807

UNITED STATES PATENT OFFICE.

GODFREY E. SUNDELL AND WALTER R. SUNDELL, OF RIDGWAY, PENNSYLVANIA.

AUTOMOBILE ACCESSORY.

Application filed May 24, 1927. Serial No. 193,883.

The present invention relates to an automobile accessory and has for its prime object to provide a structure for use as a hat rack or the like in an automobile and at the same time provides a means for holding an identification card or the like.

Another important object of the invention resides in the provision of a combination accessory including the features of a hat rack, a card holder, and a rear vision mirror.

Another important object of the invention resides in the provision of an accessory of this nature which is simple in its construction, compact and convenient, inexpensive to manufacture, thoroughly efficient and reliable for the purposes designed, and otherwise well adapted to an automobile or like vehicle.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of one embodiment of the invention showing the same mounted for use, Figure 2 is a bottom plan view thereof, Figure 3 is a sectional elevation of the card holder, Figure 4 is a transverse section through the card holder, Figure 5 is a side elevation of another embodiment of the invention, Figure 6 is a fragmentary bottom plan view thereof, Figure 7 is a vertical section taken substantially on the line 7—7 of Figure 6, Figure 8 is a perspective view of a bracket arm used with this embodiment.

Referring to the drawing in detail and first to the embodiment shown in Figures 1 to 4 inclusive, it will be seen that the letter H denotes a hatrack, the letter C a cardholder, and the letter B a bracket. The bracket B comprises a plate 5 having apertured ears 6 at its ends. The plate 5 is adapted to be fastened as at 7 to the front of the automobile interiorly thereof above the windshield. The cardholder C is in the form of a casing 8 the front wall of which is provided with an opening 9 so that a card 10 mounted in the casing may be visible through a transparent panel 11. The hatrack H is formed from a single bar of spring metal or the like and is bent so as to provide a central straight portion 12 extending through the apertures of ears 6 and through the top of the casing 8. The ends of the straight portion 12 merge into perpendicular arms 14 which in turn merge into inwardly extending arms 15 which merge into parallel portions 16 surrounding which is a band 17. These parallel portions 16 terminate in curved arms 18 for receiving a hat so as to hold the rim thereof against the roof of the automobile. Springs 19 are coiled about the straight portion 12 and have adjacent ends extended into the band 17 and the other ends in abutment with the rear wall of the casing 8 so as to normally hold the arms 8 with their extremities against the roof of the automobile.

Referring now to the embodiment of the invention shown in Figures 5 to 8 inclusive, it will be seen that the letter H' denotes the hatrack, the letter B' the bracket, and the letter C' a combined card holder and rear vision mirror. The bracket B' comprises a plate 20 attached to the front wall of the automobile by means of screws 21 or in any other suitable manner. Arms 22 and 23 extend from the ends of the plate 20 perpendicularly thereto, the arm 23 being shorter than the arm 22. The arm 23 at its extremity is provided with an aperture 24, while the arm 22 at its extremity is provided with an elongated longitudinally extending slot 25. An elongated member 26 has a lateral extension 27 at one end and is provided along one longitudinal edge with a flange 28. The extremity of the extension 27 has an opening 29 formed therein. A lug 30 extends from the member 26 perpendicularly thereto and in an opposite direction from the flange 28. The member 26 is formed with a slot 31 adjacent the extension 27. A bolt 32 extends through the slot 25 and through the slot 31 and the lug 30 also extends through the slot 25 so that the member 26 may be rigidly engaged in different positions on the arm 22 by tightening a thumb nut 33 on the bolt 32.

The combined card holder and rear vision mirror C' comprises a casing 35 with a mirror 36 in one side thereof and an opening 37 in the other side thereof through which an identification card or the like 38 may be visible. On bottom of card holder C', casing 35, is a slot for inserting identification card or like 38. Card 38 is slid upward through slot 39 dropped back downward into groove 40 which holds identification card or like securely in place. Half circle shape cut-out 41 shown in Figures 2, 5 and 6, allows the identification card or the like to be grasped by the thumb and forefinger, slid upward out of groove 40 into slot 39 and withdrawn by pulling downwardly.

The hatrack H' is of the same construction as that described in connection with the first embodiment except that the straight intermediate portion 12 is disposed obliquely to arms 14. In this embodiment this straight portion extends through the top of the casing 35 and springs 19 are associated therewith in the same manner as with the first embodiment. These springs therefore, urge the casing 35 into abutment with the flange 28 and hold the hatrack H' against the roof of the automobile.

In this second embodiment it will be seen that the mirror may be adjusted as desired by the proper manipulation of the member 26 in relation to the bracket B'. Both embodiments of the invention are very simple in their constructions and the parts thereof are compactly and conveniently arranged.

It is thought that the construction, utility, and advantages of this invention will now be quite apparent to those skilled in this art without a more detailed description. The present embodiments of the invention have been disclosed in detail merely by way of examples since in actual practice they attain the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described our invention what we claim as new is:—

In an accessory of the class described, a bracket formed with an intermediate plate having side extensions one longer than the other, the longer extension having a longitudinally extending slot and the shorter extension having an aperture, a member of an elongated nature having a flange on one longitudinal edge and a lateral extension at one end, said member having a slot, a lug extending from the member, a bolt extending through the slot, and the lug extending into the slot of the longer arm, a hat rack having a portion extending through an aperture in the lateral extension of the member and the shorter extension of the bracket, a casing on said portion, a spring on said portion having one end terminating in the casing and another end engaged with the hatrack to urge the casing in abutment with the flange of the member and the hatrack to a predetermined position.

In testimony whereof we affix our signatures.

GODFREY E. SUNDELL.
WALTER R. SUNDELL.